(12) United States Patent
Kim et al.

(10) Patent No.: US 10,291,833 B2
(45) Date of Patent: May 14, 2019

(54) MOBILE TERMINAL FOR IMAGE CAPTURING AND METHOD FOR CONTROLLING THE SAME

(71) Applicant: LG ELECTRONICS INC., Seoul (KR)

(72) Inventors: Jongpil Kim, Seoul (KR); Hakhae Kim, Seoul (KR); Dongjin Lee, Seoul (KR); Sungbum Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 15/271,877

(22) Filed: Sep. 21, 2016

(65) Prior Publication Data

US 2017/0085764 A1    Mar. 23, 2017

(30) Foreign Application Priority Data

Sep. 22, 2015 (KR) .......... 10-2015-0134084

(51) Int. Cl.
*H04N 5/225* (2006.01)
*H04N 5/262* (2006.01)
*H04N 5/232* (2006.01)
*G03B 37/04* (2006.01)
*G06K 9/20* (2006.01)

(52) U.S. Cl.
CPC ......... *H04N 5/2258* (2013.01); *H04N 5/2259* (2013.01); *H04N 5/23293* (2013.01); *H04N 5/23296* (2013.01); *G03B 37/04* (2013.01); *G06F 2203/04806* (2013.01); *G06K 2009/2045* (2013.01); *G09G 2320/068* (2013.01); *G09G 2340/045* (2013.01)

(58) Field of Classification Search
CPC ............... H04N 5/2258; H04N 5/2259; H04N 5/23293; H04N 5/23296; G03B 37/04; G06K 2009/2045; G06F 2203/04806; G09G 2320/068; G09G 2340/045
USPC ........ 348/218.1, 222.1, 227.1, 333.01, 240.2
See application file for complete search history.

(56) References Cited

U.S. PATENT DOCUMENTS 6,320,610 B1 * 11/2001 Van Sant ............... G02B 26/10
                                                                      348/143
7,965,314 B1 *  6/2011 Miller .............. G08B 13/19643
                                                                      250/330

(Continued)

FOREIGN PATENT DOCUMENTS

KR    10-2012-0021762 A    3/2012
KR    10-2013-0024160 A    3/2013

(Continued)

*Primary Examiner* — Ngoc Yen T Vu
(74) *Attorney, Agent, or Firm* — Dentons US LLP

(57) ABSTRACT

Disclosed is a dual camera module equipped in a mobile terminal. The dual camera module includes a first camera module having a first focal length and a first field of view, a second camera module spaced apart from the first camera module by a predetermined distance, the second camera module having a second focal length and a second field of view, which are different from those of the first camera module, a sensor unit located in a space between the first camera module and the second camera module, and at least one member configured to align the first and second camera modules in a line so that beginning points of the fields of view of the first and second camera modules coincide with each other.

9 Claims, 20 Drawing Sheets

(56) References Cited

U.S. PATENT DOCUMENTS

| | | | | |
|---|---|---|---|---|
| 8,860,849 | B2* | 10/2014 | Misawa | H04N 5/2258 |
| | | | | 348/240.2 |
| 9,344,629 | B2* | 5/2016 | Chang | G06T 5/002 |
| 9,609,190 | B2* | 3/2017 | Lee | H04N 5/2254 |
| 2008/0143829 | A1* | 6/2008 | Takeda | G01S 17/89 |
| | | | | 348/143 |
| 2011/0080487 | A1* | 4/2011 | Venkataraman | H04N 5/2253 |
| | | | | 348/218.1 |
| 2017/0078561 | A1* | 3/2017 | Wang | H04N 5/23216 |

FOREIGN PATENT DOCUMENTS

| KR | 10-2014-0102560 A | 8/2014 |
|---|---|---|
| KR | 10-2015-0029897 A | 3/2015 |
| KR | 10-2015-0052642 A | 5/2015 |

* cited by examiner

MOBILE TERMINAL FOR IMAGE CAPTURING AND METHOD FOR CONTROLLING THE SAME

CROSS-REFERENCE TO RELATED APPLICATION

This application claims priority to Korean Patent Application No. 10-2015-0134084 filed on Sep. 22, 2015 in Korea, the entire contents of which is hereby incorporated by reference in its entirety.

BACKGROUND OF THE DISCLOSURE

1. Field of the Disclosure

The present invention relates to a mobile terminal and a method for controlling the same, and more particularly, to a mobile terminal, which may provide a high performance image capture function based on dual cameras having different fields of view, and a method for controlling the same.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

In particular, in order to improve the image capture function of cameras, mobile terminals that are equipped with a dual camera module on the rear surface of a terminal body have gradually proliferated in recent years. In such a dual camera module, two cameras form a single image. Specifically, one camera captures the focused subject and the other camera captures an image of the surrounding background, whereby the two images are combined to form a single image.

The use of dual camera module has several advantages. First, it may acquire a more vivid image than a single camera. Second, it may realize a 3-dimensional (3D) image via a depth map. Third, it may rapidly implement auto-focus and zoom functions. Fourth, it enables realization of a simple design thanks to a reduction in thickness. Fifth, it may be used in conjunction with various applications such as, for example, augmented reality.

SUMMARY OF THE DISCLOSURE

Accordingly, an advantage of the present invention is addressing the above-noted and other problems.

Another advantage of the present invention is a novel mobile terminal that can perform successive zoom-in/out functions using dual cameras having different fields of view, and a method for controlling the same.

Another advantage of the present invention is a novel mobile terminal that can perform a 3D scanning function using dual cameras including a standard lens and a wide angle lens, and a method for controlling the same.

Another advantage of the present invention is a novel mobile terminal that can provide high quality optical images using dual cameras including a standard lens and a telephoto lens, and a method for controlling the same.

A further advantage of the present invention is a novel mobile terminal that can realize a slim configuration by locating a camera sensor unit in the empty space between a first camera and a second camera mounted in a dual camera module, and a method for controlling the same.

To achieve these and other advantages and in accordance with the purpose of the present invention, as embodied and broadly described herein, the present invention provides a dual camera module including a first camera module having a first focal length and a first field of view, a second camera module spaced apart from the first camera module by a predetermined distance, the second camera module having a second focal length and a second field of view, which are different from the first focal length and first field of view, a sensor unit located in a space between the first camera module and the second camera module, and at least one support to align the first and second camera modules so that beginning points of the fields of view of the first and second camera modules coincide.

In another aspect, the present invention provides a mobile terminal including a display unit, a dual camera module including a first camera module having a first field of view, and a second camera module having a second field of view, the second field of view being greater than the first field of view, and a controller configured to display a first preview screen, including a first captured image input via the first camera module, on the display unit when a camera application is executed, to combine the first captured image with a second captured image input via the second camera module in response to a zoom-out command, and to display a second preview screen including the combined image on the display unit.

In another aspect, the present invention provides a mobile terminal including a display unit, a dual camera module including a first camera module having a first field of view, and a second camera module having a second field of view, the second field of view being less than the first field of view, and a controller configured to display a first preview screen, including a first captured image input via the first camera module, on the display unit when a camera application is executed, to combine the first captured image with a second captured image input via the second camera module in response to a zoom-in command, and to display a second preview screen including the combined image on the display unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Reference will now be made in detail to exemplary embodiments, example of which are illustrated in the accompanying drawings. For the sake of brevity with reference to the drawings, the same reference numbers may be used for the same or equivalent components without repeating, and description thereof. In general, a suffix such as "module" and "unit" is used to refer to elements or components. Use of such a suffix herein is merely intended to facilitate the description. The suffix itself is not intended to impart any special meaning or function. In the present disclosure, that which is well-known to one of ordinary skill in the relevant art has generally been omitted for the sake of brevity. The accompanying drawings are used to help easily understand various technical features and it should be understood that the exemplary embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element with or without intervening elements. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein can be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those noted above. In addition, these teachings may also be applied to stationary terminals such as digital TV, desktop computers, and the like.

Figure 1A:
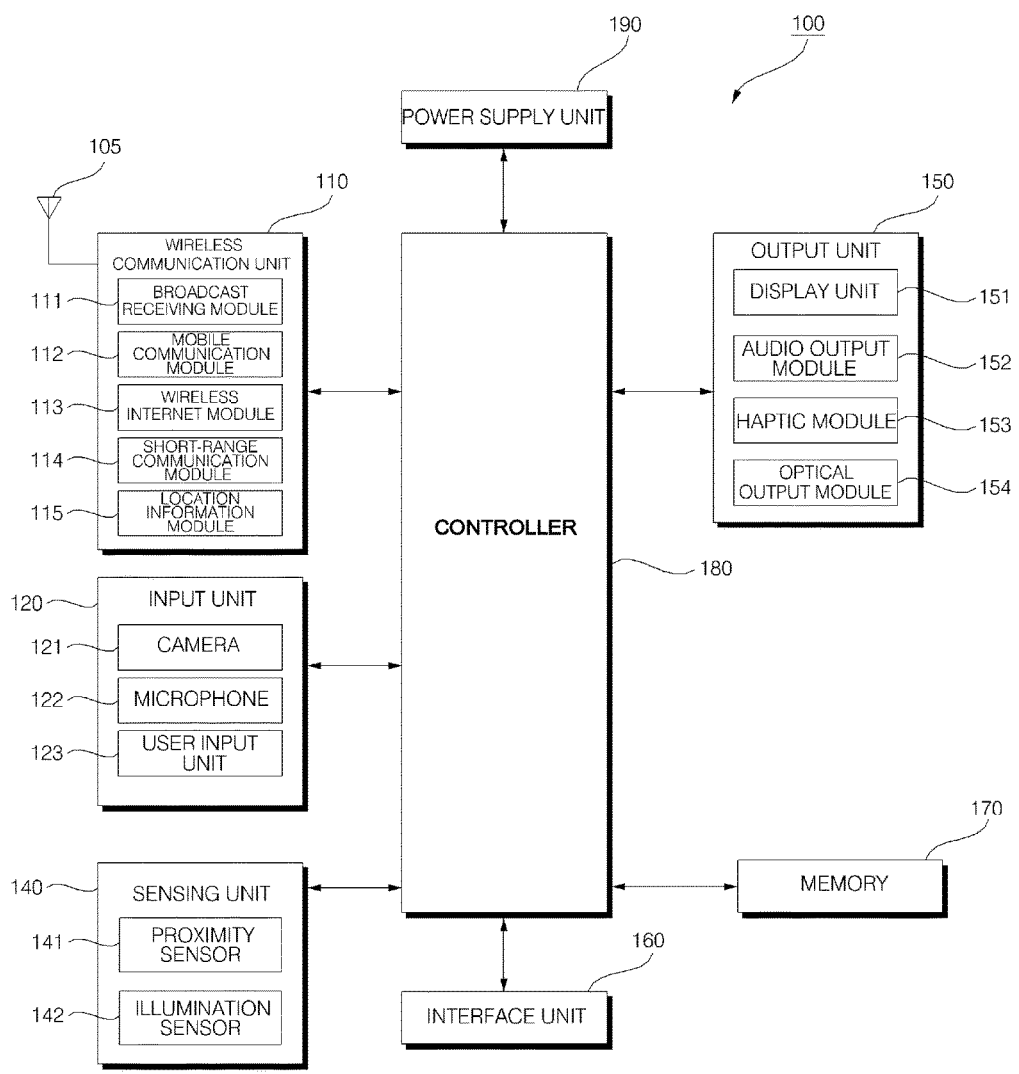
FIG. 1a is a block diagram of a mobile terminal in accordance with exemplary embodiments of the present disclosure.
Figure 1B:
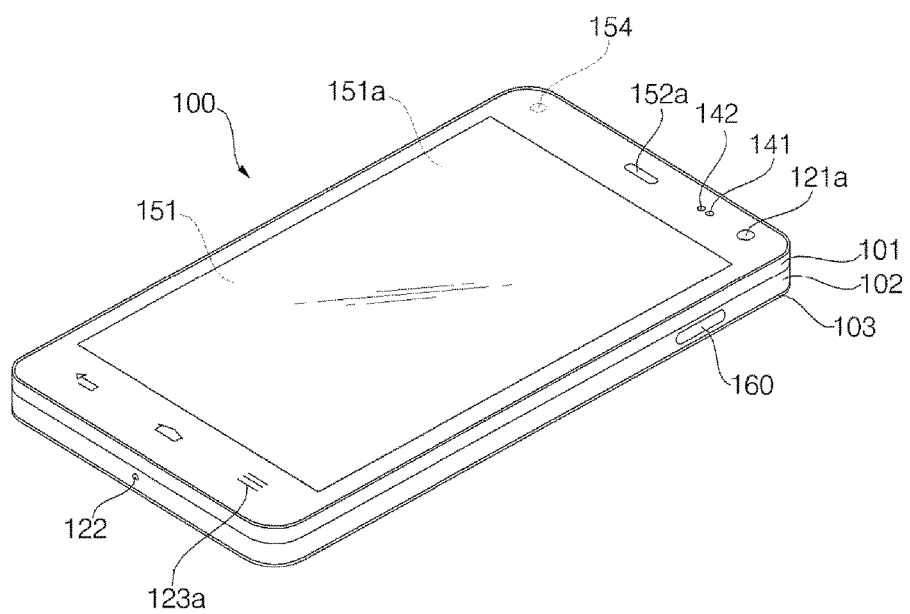
FIGS. 1b and 1c are conceptual views of one example of the mobile terminal, viewed from different directions.
Figure 1C:
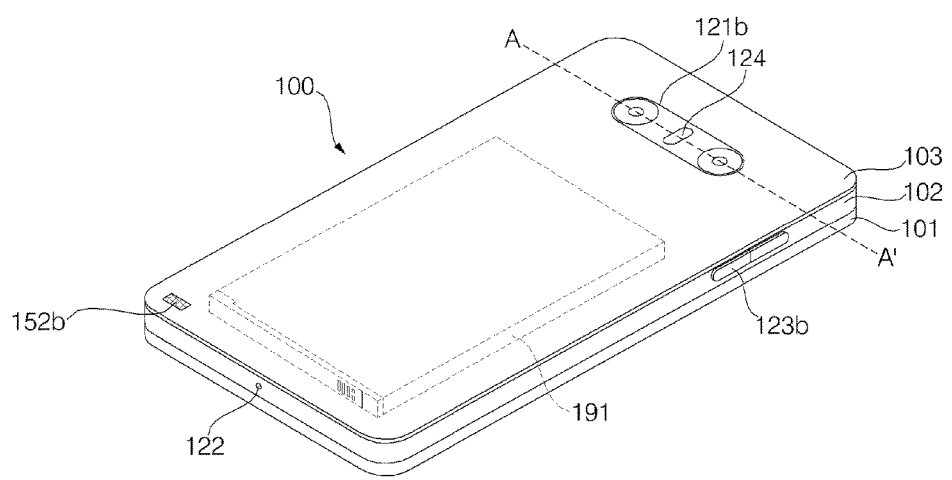

Reference is now made to FIGS. 1a-1c, where FIG. 1a is a block diagram of a mobile terminal in accordance with the present disclosure, and FIGS. 1b and 1c are conceptual views an exemplary embodiment of a mobile terminal, viewed from different directions.

A mobile terminal 100 is shown as having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1a, mobile terminal 100 is shown as having wireless communication unit 110 configured with several commonly implemented components. For instance, wireless communication unit 110 can include one or more components which permit wireless communication between mobile terminal 100 and a wireless communication system or network within which the mobile terminal is located.

Wireless communication unit 110 can include one or more modules which permit communications such as wireless communications between mobile terminal 100 and a wireless communication system, communications between mobile terminal 100 and another mobile terminal, communications between the mobile terminal 100 and an external server. Further, wireless communication unit 110 can include one or more modules which connect mobile terminal 100 to one or more networks. To facilitate such communications, wireless communication unit 110 can include one or more of a broadcast receiving module 111, a mobile communication module 112, a wireless Internet module 113, a short-range communication module 114, and a location information module 115.

Input unit 120 includes a camera 121 for obtaining images or video, a microphone 122, which is one type of audio input device for inputting an audio signal, and a user input unit 123 (for example, a touch key, a push key, a mechanical key, a soft key, and the like) to allow a user to input information. Data (for example, audio, video, image, and the like) can be obtained by the input unit 120 and can be analyzed and processed by controller 180 according to device parameters, user commands, and combinations thereof.

Sensing unit 140 can be implemented using one or more sensors configured to sense internal information of the mobile terminal, the surrounding environment of the mobile terminal, user information, and the like. For example, in FIG. 1a, the sensing unit 140 is shown as having a proximity sensor 141 and an illumination sensor 142.

If desired, the sensing unit 140 can alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. Mobile terminal 100 can be configured to utilize information obtained from sensing unit 140, and in particular, information obtained from one or more sensors of the sensing unit 140, and combinations thereof.

Output unit 150 can be configured to output various types of information, such as audio, video, tactile output, and the like. Output unit 150 is shown as having a display unit 151, an audio output module 152, a haptic module 153, and an optical output module 154.

Display unit 151 can have an inter-layered structure or an integrated structure with a touch sensor in order to facilitate a touch screen. The touch screen can provide an output interface between mobile terminal 100 and a user, as well as function as the user input unit 123 that provides an input interface between mobile terminal 100 and the user.

Interface unit 160 can serve as an interface with various types of external devices that can be coupled to mobile terminal 100. Interface unit 160, for example, can include any of wired or wireless ports, external power supply ports, wired or wireless data ports, memory card ports, ports for connecting a device having an identification module, audio input/output (I/O) ports, video I/O ports, earphone ports, and the like. In exemplary embodiments, mobile terminal 100 can perform assorted control functions associated with a connected external device, in response to the external device being connected to interface unit 160.

Memory 170 can be implemented to store data to support various functions or features of mobile terminal 100. For instance, memory 170 can be configured to store application programs executed in mobile terminal 100, data or instructions for operations of mobile terminal 100, and the like. Some of these application programs may be downloaded from an external server via wireless communication. Other application programs can be installed within mobile terminal 100 at time of manufacturing or shipping, which is typically the case for basic functions of mobile terminal 100 (for example, receiving a call, placing a call, receiving a message, sending a message, and the like). It is common for application programs to be stored in memory 170, installed in mobile terminal 100, and executed by controller 180 to perform an operation (or function) for mobile terminal 100.

Controller 180 can function to control overall operation of the mobile terminal 100, in addition to the operations associated with the application programs. Controller 180 can provide or process information or functions appropriate for a user by processing signals, data, information and the like, which are input or output by the various components depicted in FIG. 1a, or activating application programs stored in memory 170. In an exemplary embodiment, controller 180 controls some or all of the components illustrated in FIGS. 1a-1c according to the execution of an application program that have been stored in memory 170.

Power supply unit 190 can be configured to receive external power or provide internal power in order to supply appropriate power required for operating elements and components included in mobile terminal 100. Power supply unit 190 can include a battery, and the battery may be configured to be embedded in the terminal body, or configured to be detachable from the terminal body.

Referring still to FIG. 1a, various components depicted in this figure will now be described in more detail. Regarding wireless communication unit 110, broadcast receiving module 111 can be configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

Mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via mobile communication module 112 include audio call signals, video (telephony) call signals, or various formats of data to support communication of text and multimedia messages.

Wireless Internet module 113 can be configured to facilitate wireless Internet access. This module can be internally or externally coupled to mobile terminal 100. Wireless Internet module 113 can transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. Wireless Internet module 113 can transmit/receive data according to one or more of such wireless Internet technologies, and other Internet technologies as well.

In exemplary embodiments, when the wireless Internet access is implemented according to, for example, WiBro, HSDPA, HSUPA, GSM, CDMA, WCDMA, LTE, LTE-A and the like, as part of a mobile communication network, wireless Internet module 113 performs such wireless Internet access. As such, Internet module 113 can cooperate with, or function as, mobile communication module 112.

Short-range communication module 114 can be configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. Short-range communication module 114 in general supports wireless communication between a mobile terminal 100 and a wireless communication system, communications between one mobile terminal 100 and another mobile terminal 100, or communications between the mobile terminal and a network where another mobile terminal 100 (or an external server) is located, via wireless area networks. One example of the wireless area networks is a wireless personal area network.

In exemplary embodiments, another mobile terminal (which can be configured similarly to mobile terminal 100) can be a wearable device, for example, a smart watch, a smart glass or a head mounted display (HMD), which is able to exchange data with mobile terminal 100 (or otherwise cooperate with the mobile terminal 100). Short-range communication module 114 can sense or recognize the wearable device, and permit communication between the wearable device and mobile terminal 100. In addition, when the sensed wearable device is a device which is authenticated to communicate with mobile terminal 100, controller 180, for example, can cause transmission of data processed in mobile terminal 100 to the wearable device via short-range communication module 114. Hence, a user of the wearable device can use the data processed in mobile terminal 100 on the wearable device. For example, when a call is received in mobile terminal 100, the user may answer the call using the wearable device. Also, when a message is received in mobile terminal 100, the user can check the received message using the wearable device.

Location information module 115 can be configured to detect, calculate, derive or otherwise identify a position of the mobile terminal. For example, location information module 115 can include a Global Position System (GPS) module, a Wi-Fi module, or both. If desired, the location information module 115 can alternatively or additionally function with any of the other modules of wireless communication unit 110 to obtain data related to the position of the mobile terminal.

For example, when the mobile terminal uses a GPS module, a position of the mobile terminal can be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

Input unit 120 can be configured to permit various types of input to mobile terminal 100. Examples of such input include audio, image, video, data, and user input. Image and video input can be obtained using one or more cameras 121. Such cameras 121 can process image frames of still pictures or video obtained by image sensors in a video or image capture mode. The processed image frames can be displayed on display unit 151 or stored in memory 170. In some cases, cameras 121 can be arranged in a matrix configuration to permit a plurality of images having various angles or focal points to be input to mobile terminal 100. As another example, cameras 121 can be located in a stereoscopic arrangement to acquire left and right images for implementing a stereoscopic image.

Microphone 122 can be implemented to permit audio input to mobile terminal 100. The audio input can be processed in various manners in accordance with the functioning of mobile terminal 100. If desired, microphone 122 can include assorted noise removing algorithms to remove unwanted noise generated in the course of receiving the external audio.

User input unit 123 is a component that permits input by a user. Such user input can enable controller 180 to control operation of mobile terminal 100. User input unit 123 can include one or more of a mechanical input element (for example, a key, a button located on a front and/or rear surface or a side surface of mobile terminal 100, a dome switch, a jog wheel, a jog switch, and the like), or a touch-sensitive input, among others. As one example, the touch-sensitive input can be a virtual key or a soft key, which is displayed on a touch screen through software processing, or a touch key which is located on the mobile terminal at a location that is not the touch screen. The virtual key or the visual key can be displayed on the touch screen in various shapes, for example, graphic, text, icon, video, or a combination thereof.

Sensing unit 140 can be configured to sense one or more of internal information of the mobile terminal, surrounding environment information of the mobile terminal, user information, or the like. Controller 180 can work with sending unit 140 to control operation of mobile terminal 100 or execute data processing, a function or an operation associated with an application program installed in the mobile terminal based on the sensing provided by sensing unit 140. Sensing unit 140 can be implemented using any of a variety of sensors, some of which will now be described in more detail.

Proximity sensor 141 can include a sensor to sense presence or absence of an object approaching a surface, or an object located near a surface, by using an electromagnetic field, infrared rays, or the like without requiring physical contact. Proximity sensor 141 can be arranged at an inner region of the mobile terminal covered by the touch screen, or near the touch screen.

Proximity sensor 141, for example, can include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, proximity sensor 141 can sense proximity of a pointer relative to the touch screen by changes in the electromagnetic field caused by the approach of an conductive object. In this case, the touch screen (touch sensor) can also be categorized as a proximity sensor.

The term "proximity touch" will be used herein to denote the scenario in which a pointer is positioned to be proximate to the touch screen without contacting the touch screen. The term "contact touch" will be used herein to denote the scenario in which a pointer makes physical contact with the touch screen. For the position corresponding to the proximity touch of the pointer relative to the touch screen, such position will correspond to a position where the pointer is perpendicular to the touch screen. Proximity sensor 141 can sense proximity touch, and proximity touch patterns (for example, distance, direction, speed, time, position, moving status, and the like).

Controller 180 can process data corresponding to proximity touches and proximity touch patterns sensed by proximity sensor 141, and cause output of visual information on the touch screen. In addition, controller 180 can control mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

For example, the touch sensor may be configured to convert changes of pressure applied to a specific part of display unit 151, or convert capacitance occurring at a specific part of display unit 151, into electric input signals. The touch sensor may also be configured to sense not only a touched position and a touched area, but also touch pressure and/or touch capacitance. A touch object is generally used to apply a touch input to the touch sensor. Examples of touch objects include a finger, a touch pen, a stylus pen, a pointer, or the like.

When a touch input is sensed by a touch sensor, one or more corresponding signals can be transmitted to a touch controller. The touch controller can process the received signals, and then transmit corresponding data to controller 180. Accordingly, controller 180 can sense which region of display unit 151 has been touched. Here, the touch controller can be a component separate from controller 180, controller 180, and combinations thereof.

In exemplary embodiments, controller 180 can execute the same or different controls according to a type of touch object that touches the touch screen or a touch key provided in addition to the touch screen. Whether to execute the same or different control according to the object which provides a touch input can be decided based on a current operating state of mobile terminal 100 or a currently executed application program.

The touch sensor and the proximity sensor can be implemented individually, or in combination, to sense various types of touches. Such touches can include a short (or tap) touch, a long touch, a multi-touch, a drag touch, a flick touch, a pinch-in touch, a pinch-out touch, a swipe touch, a hovering touch, and the like.

If desired, an ultrasonic sensor can be implemented to recognize position information relating to a touch object using ultrasonic waves. Controller 180, for example, can calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source can be calculated using this fact. For instance, the position of the wave generation source can be calculated using the time difference from the time that the ultrasonic wave reaches the sensor based on the light as a reference signal.

Camera 121 typically includes at least one a camera sensor (CCD, CMOS etc.), a photo sensor (or image sensors), and a laser sensor.

Implementing camera 121 with a laser sensor can allow detection of a touch of a physical object with respect to a 3D stereoscopic image. The photo sensor can be laminated on, or overlapped with, the display device. The photo sensor can be configured to scan movement of the physical object in proximity to the touch screen. In more detail, the photo sensor can include photo diodes and transistors at rows and columns to scan content received at the photo sensor using an electrical signal which changes according to the quantity of applied light. Namely, the photo sensor can calculate the coordinates of the physical object according to variation of light to thus obtain position information of the physical object.

Display unit 151 can be configured to output information processed in mobile terminal 100. For example, display unit 151 can display execution screen information of an application program executing at mobile terminal 100 or user interface (UI) and graphic user interface (GUI) information in response to the execution screen information.

In exemplary embodiments, display unit 151 can be implemented as a stereoscopic display unit for displaying stereoscopic images. A stereoscopic display unit can employ a stereoscopic display scheme such as a stereoscopic scheme (a glass scheme), an auto-stereoscopic scheme (glassless scheme), a projection scheme (holographic scheme), or the like.

Audio output module 152 can be configured to output audio data. Such audio data can be obtained from any of a number of different sources, such that the audio data can be received from wireless communication unit 110 or can be stored in memory 170. The audio data can be output during modes such as a signal reception mode, a call mode, a record mode, a voice recognition mode, a broadcast reception mode, and the like. Audio output module 152 can provide audible output related to a particular function (e.g., a call signal reception sound, a message reception sound, etc.) performed by mobile terminal 100. Audio output module 152 can also be implemented as a receiver, a speaker, a buzzer, or the like.

A haptic module 153 can be configured to generate various tactile effects that a user feels, perceive, or otherwise experience. A typical example of a tactile effect generated by haptic module 153 is vibration. The strength, pattern and the like of the vibration generated by haptic module 153 can be controlled by user selection or setting by the controller. For example, haptic module 153 can output different vibrations in a combining manner or a sequential manner.

Besides vibration, haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

Haptic module 153 can also be implemented to allow the user to feel a tactile effect through a muscle sensation such as the user's fingers or arm, as well as transferring the tactile effect through direct contact. Two or more haptic modules 153 can be provided according to exemplary configurations of mobile terminal 100.

An optical output module 154 can output a signal for indicating an event generation using light of a light source. Examples of events generated in the mobile terminal 100 can include message reception, call signal reception, a missed call, an alarm, a schedule notice, an email reception, information reception through an application, and the like.

A signal output by optical output module 154 can be implemented in such a manner that the mobile terminal emits monochromatic light or light with a plurality of colors. The signal output can be terminated as the mobile terminal senses that a user has checked the generated event, for example.

Interface unit 160 serves as an interface for external devices to be connected with mobile terminal 100. For example, interface unit 160 can receive data transmitted from an external device, receive power to transfer to elements and components within mobile terminal 100, or transmit internal data of mobile terminal 100 to such external device. Interface unit 160 can include wired or wireless headset ports, external power supply ports, wired or wireless data ports, memory card ports, ports for connecting a device having an identification module, audio input/output (I/O) ports, video I/O ports, earphone ports, or the like.

The identification module can be a chip that stores various information for authenticating permission to operate mobile terminal 100 and can include a user identity module (UIM), a subscriber identity module (SIM), a universal subscriber identity module (USIM), and the like. In addition, the device having the identification module (also referred to herein as an "identifying device") can take the form of a smart card. Accordingly, the identifying device can be connected with terminal 100 via interface unit 160.

When mobile terminal 100 is connected with an external cradle, interface unit 160 can serve as a passage to allow power from the cradle to be supplied to mobile terminal 100 or can serve as a passage to allow various command signals input by the user from the cradle to be transferred to the mobile terminal there through. Various command signals or power input from the cradle can operate as signals for recognizing that mobile terminal is properly mounted on the cradle.

Memory 170 can store programs to support operations of the controller 180 and store input/output data (for example, phonebook, messages, still images, videos, etc.). Memory 170 can store data related to various patterns of vibrations and audio which are output in response to touch inputs on the touch screen.

Memory 170 can include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. Mobile terminal 100 can also be operated in relation to a network storage device that performs the storage function of memory 170 over a network, such as the Internet.

Controller 180 can be control the general operations of mobile terminal 100. For example, controller 180 can set or release a lock state for restricting a user from inputting a control command with respect to applications when a status of the mobile terminal meets a preset condition.

Controller 180 can also perform the controlling and processing associated with voice calls, data communications, video calls, and the like, or perform pattern recognition processing to recognize a handwriting input or a picture drawing input performed on the touch screen as characters or images, respectively. In addition, controller 180 can control one or a combination of these components in order to implement various exemplary embodiments disclosed herein.

Power supply unit 190 can receive external power or provide internal power and supply the appropriate power required for operating respective elements and components included in mobile terminal 100. Power supply unit 190 can include a battery, which is typically rechargeable or be detachably coupled to the terminal body for charging.

Power supply unit 190 can include a connection port. For example, the connection port can be configured as interface unit 160 to which an external charger for supplying power to recharge the battery is electrically connected.

As another example, power supply unit 190 can be configured to recharge the battery in a wireless manner without use of the connection port. Power supply unit 190 can receive power transferred from an external wireless power transmitter using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1b and 1c, mobile terminal 100 is described with reference to a bar-type terminal body. Alternatively, mobile terminal 100 can be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Mobile terminal 100 can include a case (for example, frame, housing, cover, and the like) forming the appearance of the terminal. In this embodiment, the case is formed using a front case 101 and a rear case 102. Various electronic components can be incorporated into a space formed between the front case 101 and the rear case 102. At least one middle case can be additionally positioned between the front case 101 and the rear case 102.

Display unit 151 can be located on the front side of the terminal body to output information. As illustrated, a window 151a for display unit 151 may be mounted to front case 101 to form the front surface of the terminal body together with front case 101.

In exemplary embodiments, electronic components can also be mounted to rear case 102. Examples of such electronic components include a detachable battery 191, an identification module, a memory card, and the like. Rear cover 103 is shown covering the electronic components, and this cover can be detachably coupled to rear case 102. Therefore, when rear cover 103 is detached from rear case 102, the electronic components mounted to rear case 102 become exposed.

As illustrated, when rear cover 103 is coupled to rear case 102, a side surface of rear case 102 can be partially exposed. In exemplary embodiments, when coupled, rear case 102 can also be completely shielded by rear cover 103. In some embodiments, rear cover 103 can include an opening to expose a camera 121b or an audio output module 152b.

Cases 101, 102, and 103 can be formed by injection-molding synthetic resin or may be formed of metal, for example, stainless steel (STS), aluminum (Al), titanium (Ti), or the like.

As an alternative to the example in which the plurality of cases form an inner space for accommodating components, mobile terminal 100 can be configured such that a single case forms the inner space. For example, a mobile terminal 100 having a uni-body is formed in such a manner that synthetic resin or metal extends from a side surface to a rear surface.

If desired, mobile terminal 100 may include a waterproofing unit (not shown) for preventing introduction of water into the terminal body. For example, the waterproofing unit may include a waterproofing member which is located between window 151a and front case 101, between front case 101 and rear case 102, or between rear case 102 and rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, first manipulation unit 123a may be located on another surface of the terminal body, and the second audio output module 152b may be located on the side surface of the terminal body.

Display unit 151 can output information processed in mobile terminal 100. Display unit 151 can be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

Display unit 151 can be implemented using two display devices, which can implement the same or different display technology. For instance, a plurality of display units 151 can be arranged on one side, either spaced apart from each other, or these devices may be integrated, or these devices can be arranged on different surfaces.

Display unit 151 can also include a touch sensor which senses a touch input received at the display unit. When a touch is input to display unit 151, the touch sensor may be configured to sense this touch and controller 180, for example, can generate a control command or other signal corresponding to the touch. The content of the input via touching can be a text or numerical value, or a menu item which can be indicated or designated in various modes.

The touch sensor may be configured in form of a film having a touch pattern, disposed between window 151a and a display on a rear surface of window 151a, or a metal wire which can be patterned directly on the rear surface of window 151a. Alternatively, the touch sensor may be integrally formed with the display. For example, the touch sensor may be disposed on a substrate of the display or within the display.

Display unit 151 can also form a touch screen together with the touch sensor. Here, the touch screen can serve as user input unit 123 (see FIG. 1a). Therefore, the touch screen can replace at least some of the functions of first manipulation unit 123a.

First audio output module 152a can be implemented in the form of a speaker to output voice audio, alarm sounds, multimedia audio reproduction, and the like.

Window 151a of display unit 151 can include an aperture to permit audio generated by first audio output module 152a to pass. One alternative is to allow audio to be released along an assembly gap between the structural bodies (for example, a gap between window 151a and front case 101). In this case, a hole independently formed to output audio sounds may not be seen or is otherwise hidden in terms of appearance, thereby further simplifying the appearance and manufacturing of mobile terminal 100.

Optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control optical output unit 154 to stop the light output.

First camera 121a can process image frames such as still or moving images obtained by the image sensor in a capture mode or a video call mode. The processed image frames can then be displayed on display unit 151 or stored in memory 170.

First camera 121a can include two cameras spaced apart from each other by a predetermined distance in the horizontal direction. Thus, the first camera 121a can be named "a dual camera module". When first camera 121a is configured as a dual camera module, it can capture images in different manners via the two cameras, and can acquire higher quality images.

First and second manipulation units 123a and 123b are examples of user input unit 123, which can be manipulated by a user to provide input to mobile terminal 100. First and second manipulation units 123a and 123b can also be commonly referred to as a manipulating portion, and can employ any tactile method that allows the user to perform manipulation such as touch, push, scroll, or the like. First and second manipulation units 123a and 123b can also employ any non-tactile method that allows the user to perform manipulation such as proximity touch, hovering, or the like.

FIG. 1b illustrates first manipulation unit 123a as a touch key, but possible alternatives include a mechanical key, a push key, a touch key, and combinations thereof.

Input received at first and second manipulation units 123a and 123b can be used in various ways. For example, first manipulation unit 123a can be used by the user to provide an input to a menu, home key, cancel, search, or the like, and second manipulation unit 123b can be used by the user to provide an input to control a volume level being output from first or second audio output modules 152a or 152b, to switch to a touch recognition mode of display unit 151, or the like.

In another example of user input unit 123, a rear input unit (not shown) may be located on the rear surface of the terminal body. The rear input unit can be manipulated by a user to provide input to mobile terminal 100. The input may be used in a variety of different ways. For example, the rear input unit can be used by the user to provide an input for power on/off, start, end, scroll, control volume level being output from first or second audio output modules 152a or 152b, switch to a touch recognition mode of display unit 151, and the like. The rear input unit may be configured to permit touch input, a push input, or combinations thereof.

The rear input unit can be located to overlap display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, mobile terminal 100 can include a finger scan sensor that can scan a user's fingerprint. Controller 180 can use fingerprint information sensed by the finger scan sensor as part of an authentication procedure. The finger scan sensor can also be installed in display unit 151 or implemented in user input unit 123.

The microphone 122 is shown located at an end of mobile terminal 100, but other locations are possible. If desired, multiple microphones may be implemented, with such an arrangement permitting the receiving of stereo sounds.

Interface unit 160 can serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. Interface unit 160 can be implemented in the form of a socket for accommodating an external card, such as Subscriber Identification Module (SIM), User Identity Module (UIM), or a memory card for information storage.

Second camera 121b can be located at the rear side of the terminal body and includes an image capturing direction that is substantially opposite to the image capturing direction of first camera unit 121a.

Second camera 121b can include two cameras spaced apart from each other by a predetermined distance in the horizontal direction or in the vertical direction. Thus, second camera 121b can be named "a dual camera module". Where second camera 121b is configured as a dual camera module, it can capture images in different manners via the two cameras, and can acquire higher quality images.

A flash 124 can be located between the first camera module and the second camera module constituting dual camera module 121b. Flash 124 can emit light when the dual camera module 121b captures an image of a subject.

As shown in FIG. 1b, second audio output module 152b can be located on the terminal body. Second audio output module 152b can implement stereophonic sound functions in conjunction with first audio output module 152a, and can be also used for implementing a speaker phone mode for call communication.

At least one antenna for wireless communication can be located on the terminal body. The antenna can be installed in the terminal body or formed by the case. For example, an antenna that is configured as a part of broadcast receiving module 111 can be made to retract into the terminal body. Alternatively, an antenna can be formed using a film attached to an inner surface of rear cover 103, or a case that includes a conductive material.

A power supply unit 190 for supplying power to mobile terminal 100 can include a battery 191 mounted in the terminal body or detachably coupled to an outside of the terminal body. Battery 191 can receive power via a power source cable connected to interface unit 160. Battery 191 can be recharged wirelessly using a wireless charger. Wireless charging can be implemented by magnetic induction or electromagnetic resonance.

Rear cover 103 can be coupled to rear case 102 for shielding battery 191, to prevent separation of battery 191, and to protect battery 191 from an external impact or from foreign material. When battery 191 can be detachable from the terminal body, rear case 103 can be detachably coupled to rear case 102.

An accessory for protecting an appearance or assisting or extending the functions of mobile terminal 100 can also be provided on mobile terminal 100. As one example of an accessory, a cover or pouch for covering or accommodating at least one surface of mobile terminal 100 can be provided. The cover or pouch can work together with display unit 151 to extend the function of mobile terminal 100. Another example of the accessory is a touch pen for assisting with or extending a touch input to a touch screen.

Further preferred embodiments will be described in more detail with reference to additional drawings. It should be understood by those skilled in the art that the present features can be embodied in several forms without departing from the characteristics thereof.

In the above, the configuration of mobile terminal 100 in accordance with the present disclosure has been described with reference to FIGS. 1a to 1c. Hereinafter, the configuration of a dual camera module mounted to the rear surface of the mobile terminal in accordance with the present disclosure and components constituting the dual camera module will be described in detail.

Figure 2A:
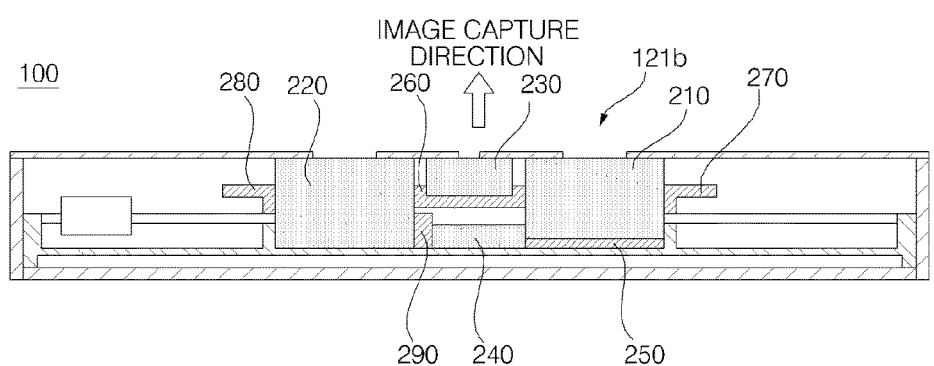
FIGS. 2a and 2b are diagrams referenced to explain the configuration of a dual camera module in accordance with exemplary embodiments of the present disclosure.
Figure 2B:
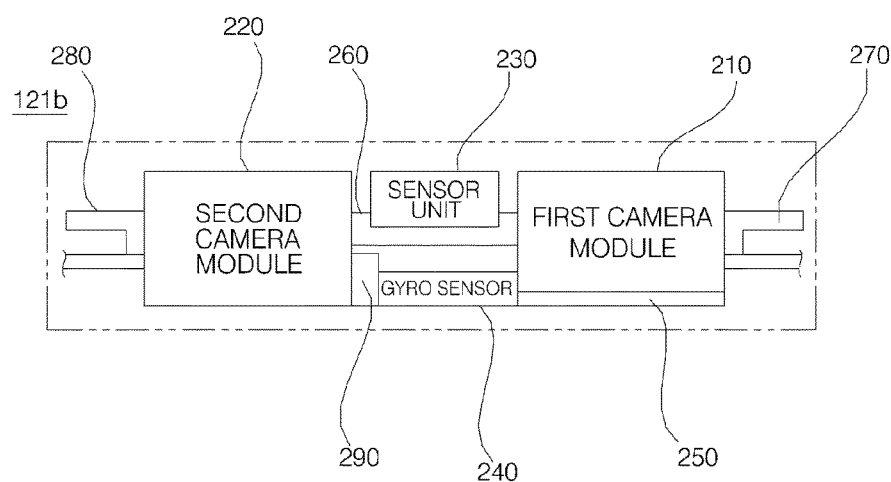

FIGS. 2a and 2b are views referenced to explain the configuration of a dual camera module in accordance with exemplary embodiments of the present disclosure. That is, FIG. 2a is a view illustrating a cross section of the mobile terminal taken along the dashed line A-A' of FIG. 1c, and FIG. 2b is a view schematically illustrating the side surface of the dual camera module.

Referring to FIGS. 2a and 2b, dual camera module 121b can include, for example, a first camera module 210, a second camera module 220, a camera sensor unit 230, a gyro sensor 240, first and second support members 250 and 260, and first to third fixing members 270 to 290.

First camera module 210 can include a lens assembly, an IR filter, an image sensor, and an AF driver. The lens assembly used in first camera module 210 can be a standard lens assembly that can be used in a camera for a cellular phone, and the focal length thereof, converted on the basis of a 35 mm full frame, can be 43.27 mm. Thus, first camera module 210 can form a captured image typically having a field of view (FOV) within a range of 60 degrees to 80 degrees via the standard lens assembly.

Second camera module 220 can include a lens assembly, an IR filter, and an image sensor. The lens assembly used in second camera module 220 can be a wide angle lens assembly, which has a shorter focal length than the conversion focal length (43.27 mm) of the standard lens assembly and has a field of view of 90 degrees or more. In addition, the lens assembly used in second camera module 220 can be a telephoto lens assembly, which has a longer focal length than the conversion focal length (43.27 mm) of the standard lens assembly and has a field of view of 50 degrees or less.

In a case where the wide angle lens assembly is used as the lens assembly, second camera module 220 can produce a captured image having a field of view of 90 degrees or more. Meanwhile, in a case where the telephoto lens assembly is used as the lens assembly, second camera module 220 can produce a captured image having a field of view of 50 degrees or less.

Camera sensor unit 230 can be located in the empty space between first camera module 210 and second camera module 220, and can include, for example, a flash, an RGB sensor, and a laser sensor. Gyro sensor 240 can also be located in the empty space between first camera module 210 and second camera module 220. In exemplary embodiments, gyro sensor 240 can be spaced apart downward from camera sensor unit 230 by a predetermined distance. By having camera sensor unit 230 and gyro sensor 240 located in the empty space between first and second camera modules 210 and 220, mobile terminal 100 can achieve a slimmer configuration.

First support member 250 can be located below first camera module 210 and can serve to align the heights of first camera module 210 and second camera module 220. That is, first support member 250 can be used to correct the height of first camera module 210 so that the beginning points of the fields of view of first camera module 210 and second camera module 220 coincide with each other.

In embodiments, first and second camera modules 210 and 220 can have different sizes because of the different number of pixels in first and second camera modules 210 and 220. In such embodiments, it can be necessary to correct the height of first and second camera modules 210 and 220 using first support member 250. The height correction can prevent a magnification difference caused by the distance difference in the dual camera module, thereby effectively realizing, for example, a 3D image capture/scanning function and a zoom-in/out function.

Second support member 260 can be attached to both first and second camera modules 210 and 220 and can serve to support camera sensor unit 230. In addition, together with first and third fixing members 270 to 290, second support member 260 can serve to align first and second camera modules 210 and 220 in the horizontal direction.

First fixing member 270 and second fixing member 280 can be attached to first and second camera modules 210 and 220 respectively, and serve to align first and second camera modules 210 and 220 in the horizontal direction. First and second fixing members 270 and 280 can have an "L"-shaped form, and can be supported by an external structure (not illustrated) owing to this shape.

Third fixing member 290 can be attached to both second camera module 220 and gyro sensor 240 and can serve to fix second camera module 220 and gyro sensor 240. Third fixing member 290 can extend upward so as to be connected to second support member 260.

It will be clear to those skilled in the art that other fixing members can be installed, in addition to first to third fixing members 270 to 290. In addition, it will be clear to those skilled in the art that other support members can be installed, in addition to first and second support members 250 and 260.

Figure 3:
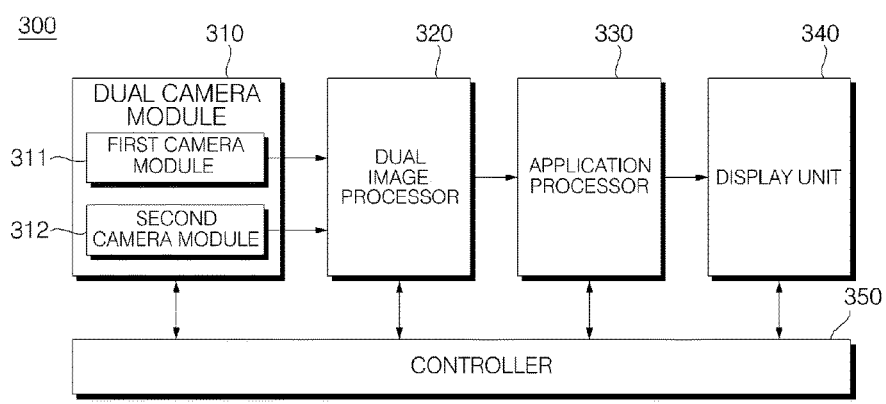
FIG. 3 is a block diagram illustrating the configuration of an image capture device which performs an image capture function using a dual camera module in accordance with exemplary embodiments of the present disclosure.

FIG. 3 is a block diagram illustrating the configuration of an image capture device which performs an image capture function using a dual camera module in accordance with exemplary embodiments of the present disclosure.

Referring to FIG. 3, an image capture device 300 equipped in mobile terminal 100 can include, for example, a dual camera module 310, a dual image processor 320, an application processor 330, a display unit 340, and a controller 350.

Dual camera module 310 can activate at least one of a first camera 311 and a second camera 313 in response to a control command from controller 350. Dual camera module 310 can output at least one captured image, input via the activated first and/or second camera, to dual image processor 320.

In response to a control command from the controller 350, dual image processor 320 can combine a first captured image input via first camera 311 with a second captured image input via the second camera 313.

For example, in embodiments where dual camera modules have the same field of view, the first captured image may be an image captured as first camera 311 focuses on an subject, and the second captured image may be an image captured as second camera 313 focuses on the background. In this case, dual image processor 320 may provide a high quality image by combining an subject area extracted from the first captured image and a background area extracted from the second captured image.

Also, in embodiments where dual camera modules have different fields of view, the first captured image input via first camera 311, which can have a small field of view, can be included in a second captured image input via second camera 313, which has a large field of view. In this case, dual image processor 320 can extract a first image area, corresponding to the overlapping captured area, from the first captured image, and can extract a second image area, corresponding to the non-overlapping captured area, from the second captured image. Then, dual image processor 320 can provide a high quality image by combining the extracted first and second image areas.

Alternatively, the second captured image input via second camera 313, which can have a small field of view, can be included in the first captured image input via the first camera 311, which can have a large field of view. In this case, dual image processor 320 can extract a first image area, corresponding to the overlapping captured area, from the second captured image, and may extract a second image area, corresponding to the non-overlapping area, from the first captured image. Dual image processor 320 can then provide a high quality image by combining the extracted first and second image areas.

When a separate image combining process is not required, dual image processor 320 can bypass the first captured image input via first camera 311 or second captured image input via second camera 313 to application processor 330 in response to a control command from controller 350.

Application processor 330 performs known image signal processing such as, for example, Bayer processing, RGB processing, or YUV processing on image raw data provided from dual camera module 310 or dual image processor 320.

When image signal processing by application processor 330 is completed, display unit 340 can display the image in response to a control command from controller 350.

Controller 350 controls general operations associated with the image capture function of mobile terminal 100. Hereinafter, the operation of the mobile terminal for performing various image capture functions using dual cameras (that is, dual cameras having different fields of view) will be described.

First Embodiment

Figure 4A:
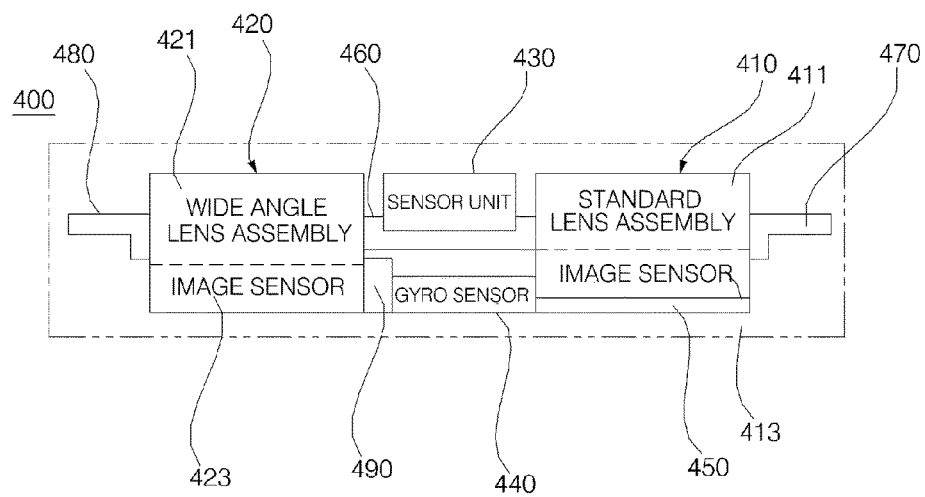
FIGS. 4(a)-(b) and 5(a)-(b) are diagrams referenced to explain the configuration of a dual camera module in accordance with a first embodiment of the present disclosure.

FIGS. 4 and 5 explain the configuration of a dual camera module in accordance with a first embodiment of the present disclosure.

Referring to FIGS. 4 and 5, a dual camera module 400 can include, for example, a first camera module 410, a second camera module 420, a camera sensor unit 430, a gyro sensor 440, first and second support members 450 and 460, and first to third fixing members 470 to 490.

First camera module 410 can include a standard lens assembly 411, an IR filter (not illustrated), an image sensor 413, and an AF driver (not illustrated). Standard lens assembly 411, used in first camera module 410, can have a conversion focal length of 43.27 mm and a field of view within a range of 60 degrees to 80 degrees. In addition, as a non-limiting embodiment, image sensor 413 used in first camera module 410 can have an aspect ratio of 16:9 and may include 16 mega pixels.

Figure 5A:
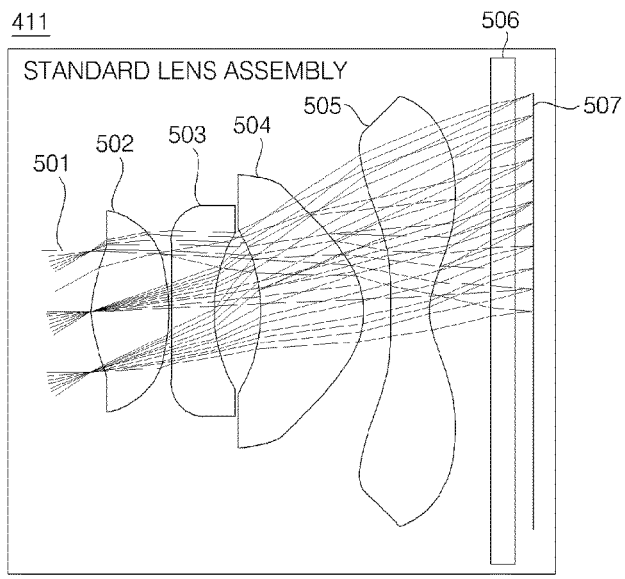

In an exemplary embodiment illustrated in FIG. 5(a), standard lens assembly 411 can have a configuration in which an aperture 501, a first lens 502, a second lens 503, a third lens 504, and a fourth lens 505 are arranged in sequence starting from the object side. A lens assembly having a field of view within a range from 60 degrees to 80 degrees can be realized through appropriate design of, for example, the arrangement, refractive power, refractive index, thicknesses, sizes, and shapes of lenses 502 to 505.

Standard lens assembly 411 can be configured by arranging a plurality of lenses in a line along the optical axis. In this manner it can be possible to attract a great amount of light from a target subject and to refract the light so that it is converged at one location on image sensor 507. In this exemplary embodiment, light beams that travel straight from the target are converged to one point while passing through the lenses to form an image. The distance between an image sensor 507, on which the image is formed and the lenses is referred to as the focal length.

Light corresponding to image information of the target subject sequentially passes through aperture 501, first lens 502, second lens 503, third lens 504, fourth lens 505, and infrared filter 506 of standard lens assembly 411 and is introduced into image sensor 507.

It will be clear to those skilled in the art that, although the present embodiment illustrates the standard lens assembly 411 as including four lenses, standard lens assembly 411 is not so limited and can include a larger or smaller number of lenses.

Second camera module 420 can include a wide angle lens assembly 421, an IR filter (not illustrated), and an image sensor 423. For example, wide angle lens assembly 421 used in second camera module 420 can have a shorter focal length (e.g. 15.23 mm) than the conversion focal length of standard lens assembly 411 and a field of view of 90 degrees or more (e.g. 140 degrees). In addition, second camera module 220 can be a fixed-focus type and can exclude an AF driver.

In addition, by way of a non-limiting example, image sensor 423 used in the second camera module 420 can have an aspect ratio of 4:3 and can include 8 mega pixels.

Figure 5B:
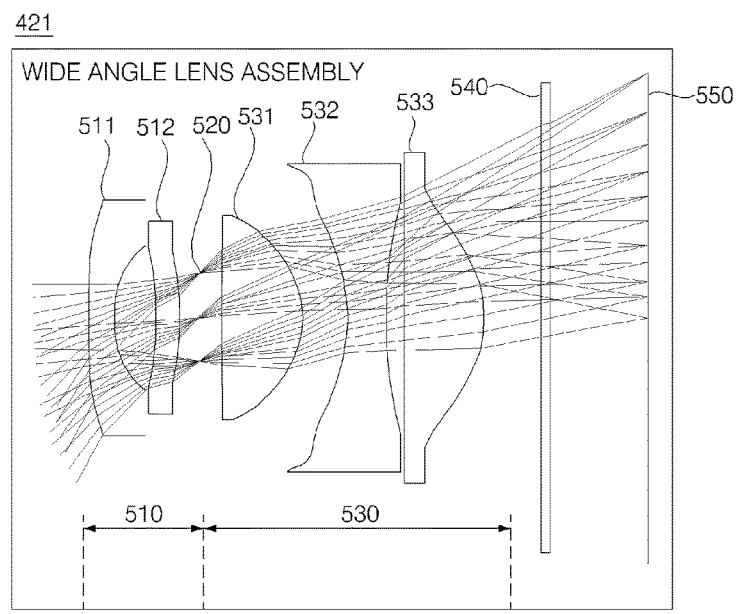

In an exemplary embodiment illustrated in FIG. 5(b), wide angle lens assembly 421 can have a configuration in which a first lens group 510, an aperture 520, and a second lens group 530 are arranged in sequence starting from the object side.

First lens group 510 can consist of a first lens 511 and a second lens 512, and can serve to increase an incidence angle (i.e. a field of view). As such, wide angle lens assembly 421 can acquire a wide angle image of 90 degrees or more.

Second lens group 530 can consist of third to fifth lenses 531 to 533, and can serve to concentrate light, introduced through first lens group 510, on image sensor 550. A lens assembly having a field of view of 90 degrees or more can be realized through appropriate design of, for example, the arrangement, refractive power, refractive index, thicknesses, sizes, and shapes of first and second lens groups 510 and 530.

Light corresponding to image information of a target object sequentially passes through first lens group 510, aperture 520, second lens group 530, and infrared filter 540 of wide angle lens assembly 421 and is introduced into image sensor 550.

It will be clear to those skilled in the art that, although the present embodiment illustrates wide angle lens assembly 421 as including total five lenses, wide angle lens assembly 421 is not so limited and can include a larger or smaller number of lenses. In addition, it will be clear to those skilled in the art that, although the present embodiment illustrates wide angle lens assembly 421 as including the two lens groups, wide angle lens assembly 421 is not limited thereto, and can include a larger number of lens groups.

Second camera module 420 can provide the effect of increasing perspective owing to a wide field of view.

When capturing parallel lines having a constant distance therebetween via a lens, a nearby portion can appear to be wide and a faraway portion can appear narrow. Since this difference in width can become severe as the field of view of the lens is broadened, perspective is emphasized more in photographs captured using a wide angle lens.

Figure 6A:
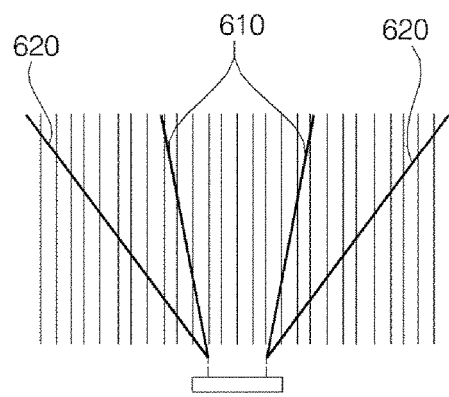
FIGS. 6(a) and 6(b) are diagrams comparing the perspective effect of a standard lens with the perspective effect of a wide angle lens.
Figure 6B:
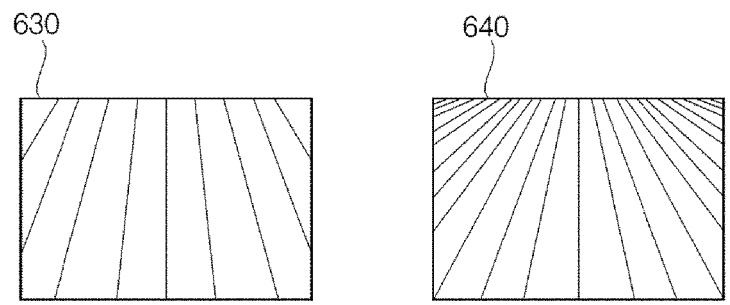

For example, as illustrated in FIGS. 6(a) and 6(b), a lens having a narrow field of view can catch the inside of a first line 610, but a lens having a wide field of view can catch the inside of a second line 620. Thus, it can be confirmed that perspective is magnified more in a right image 640, captured by the lens having a wide field of view than in a left image 630 captured by the lens having a narrow field of view.

First camera module 410, mounted in the dual camera module 400 in accordance with a first embodiment of the present disclosure, may produce a captured image, which can have a field of view within a range from 60 degrees to 80 degrees, via standard lens assembly 411. Second camera module 420, mounted in dual camera module 400, can produce a captured image having a wide field of view of 90 degrees or more, or an ultra-wide field of view of 120 degrees or more.

Figure 4B:
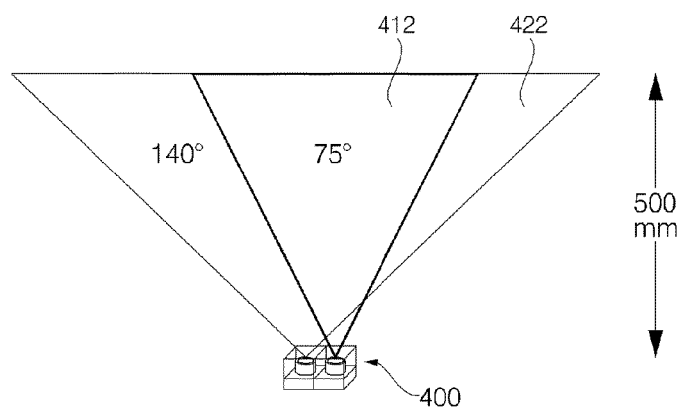

In this way, as illustrated in FIG. 4(b), a captured area 412, input via first camera module 410, is included in a captured area 422 input via second camera module 420. Accordingly, the image capture areas of first and second camera modules 410 and 420 overlap each other.

Figure 7:
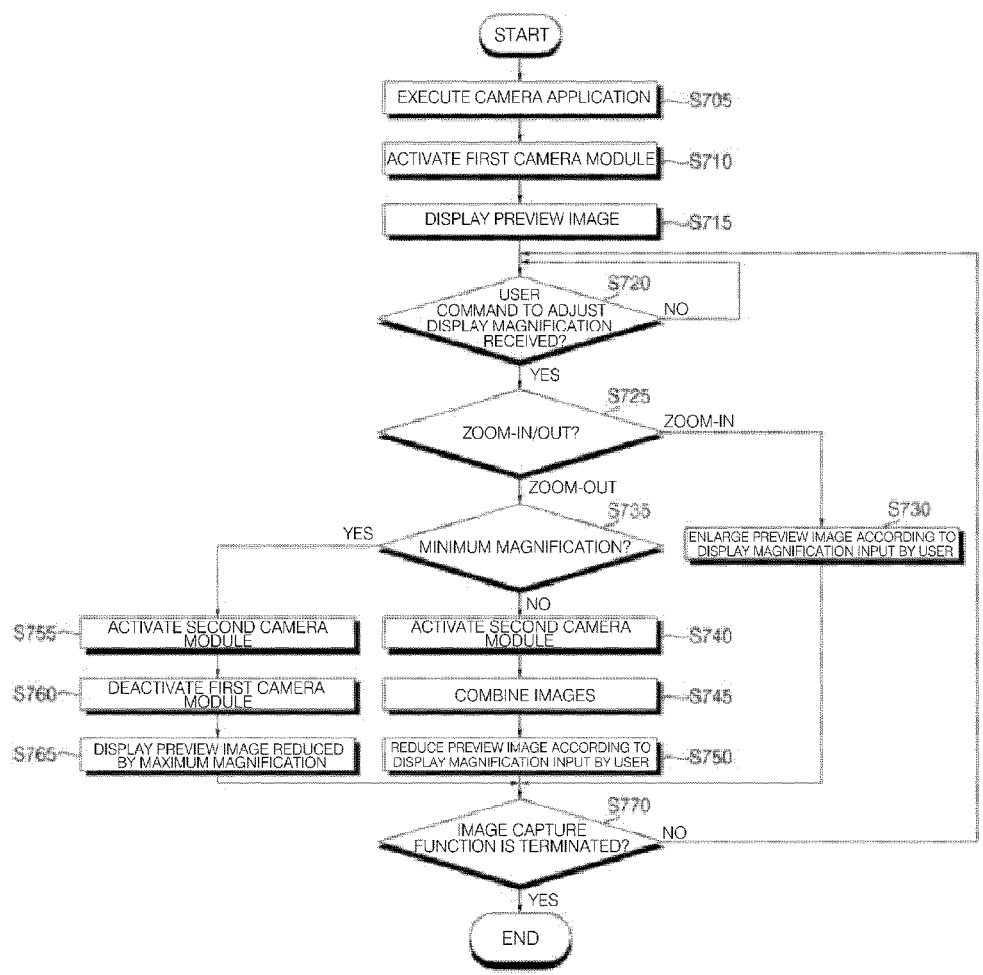
FIG. 7 is a flowchart illustrating the procedure in which the mobile terminal performs a zoom-in/out operation using the dual camera module in accordance with the first embodiment of exemplary embodiments of the present disclosure.

FIG. 7 is a flowchart illustrating the procedure in which the mobile terminal can perform a zoom-in/out operation using the dual camera module in accordance with the first embodiment of the present disclosure.

Referring to FIG. 7, controller 180 can execute a camera application in response to, for example, a user command (S705).

Controller 180 can activate first camera module 410 of dual camera module 400 upon execution of camera application (S710). In an exemplary embodiment, first camera module 410 can include standard lens assembly 411.

Controller 180 can display a preview image, input via first camera module 410, on display unit 151 (S715). The preview image displayed on the display unit 151 can be an image having a display magnification of, for example, 1 (×1.0).

When the preview image is displayed, controller 180 can check whether or not a user command to change the display magnification of the preview image (i.e. a zoom-in/out command) has been received (S720). The user command can be a pinch in/out motion, or user input for touching a separate zoom icon, received via the display unit 151, without being limited thereto.

When the checked result of step S720 is that a zoom-in command has been received (S725), controller 180 can enlarge the preview image according to the display magnification corresponding to the zoom-in command and display the same on display unit 151 (S730). The preview image displayed on display unit 151 can be generated via a first captured image input via first camera module 410.

When the zoom-in command is continuously received, controller 180 can enlarge the preview image, input via first camera module 410, by the maximum display magnification (e.g. ×8.0) and display the same on display unit 151.

Meanwhile, when the checked result of step S720 is that a zoom-out command has been received (S725), controller 180 can activate second camera module 420 of the dual camera module 400 (S740). Here, second camera module 420 can include wide angle lens assembly 421.

Controller 180 can perform an operation of combining a first captured image, input via first camera module 410, with a second captured image input via second camera module 420, upon receiving the zoom-out command (S745).

Figure 8:
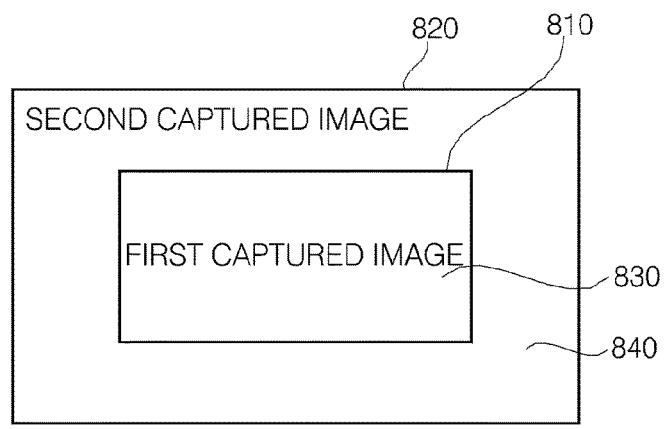
FIG. 8 is a diagram referenced to explain that an area captured via a first camera module is included in an area captured via a second camera module in the dual camera module in accordance with the first embodiment of the present disclosure.

In an exemplary embodiment illustrated in FIG. 8, a first captured image 810, input via first camera module 410, which has a small field of view, may be included in a second captured image 820 input via second camera module 420, which has a large field of view. Controller 180 can extract and combine a first image area 830, corresponding to the overlapping captured area, and a second image area 840, corresponding to the non-overlapping captured area, via the dual image processor. First image area 830 can be extracted from first captured image 810, and second image area 840 can be extracted from second captured image 820.

Controller 180 can reduce the preview image according to the display magnification corresponding to the zoom-out command and displays the same on display unit 151 (S750). The preview image, displayed on display unit 151, can be generated by combining the first captured image input via first camera module 410 with the second captured image input via second camera module 420.

If the minimum display magnification according to the continuous zoom-out command (S735) is reached, controller 180 can deactivate first camera module 410 of dual camera module 400 (S760), and operate only second camera module 420 of dual camera module 400 (S755).

Controller 180 can display the preview image corresponding to the minimum display magnification (i.e. the preview image reduced by the maximum magnification) on display unit 151 (S765). The preview image displayed on display unit 151 can be generated from second captured image input via second camera 420.

Figure 9A:
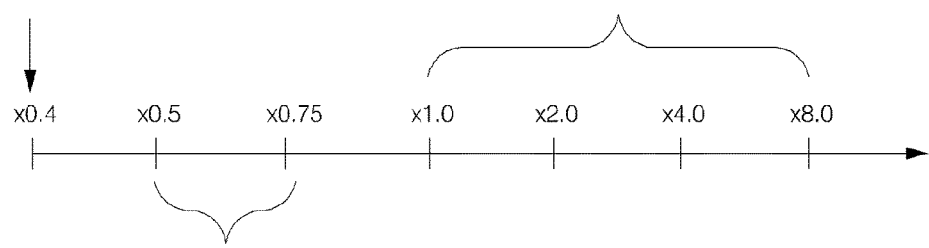
FIGS. 9(a) and 9(b) are diagrams referenced to explain the overall operation of the dual camera module in response to a zoom-in/out motion of the user.
Figure 9B:
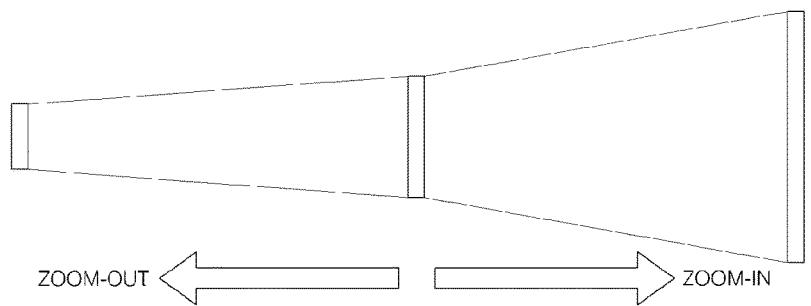

As illustrated in FIG. 9, briefly summarizing the overall operation of dual camera module 400 in response to the zoom-in/out motion of the user, when the display magnification of dual camera module 400 is 1 (×1.0) according to an image capture command from the user, controller 180 can activate just first camera module 410 and display the preview image input via first camera module 410 on display unit 151.

In addition, when the display magnification of dual camera module 400 is within a range of 1 (×1.0) to the maximum display magnification (×8.0) according to the zoom-in motion of the user, controller 180 can enlarge the preview image, input via activated first camera module 410, according to the display magnification, and display the same on display unit 151.

When the display magnification of dual camera module 400 is within a range of the minimum display magnification (×0.4) to 1 (×1.0) (for example, when the display magnification is 0.5 or 0.75) according to the zoom-out motion of the user, controller 180 can simultaneously activate first and second camera modules 410 and 420, reduce the preview image acquired by combining the images input via first and second camera modules 410 and 420 according to the display magnification, and display the reduced preview image on display unit 151.

In addition, when the display magnification of dual camera module 400 is the minimum display magnification (e.g. ×0.4), controller 180 can activate just second camera module 420, maximally reduce the preview image input via second camera module 420 according to the display magnification, and display the reduced preview image on display unit 151.

Thereafter, when a user command to end the image capture command is received (S770), controller 180 can terminate the zoom-in/out process using the dual camera module in accordance with the first embodiment of the present disclosure. Meanwhile, when no user command to end the image capture command is received (S770), controller 180 can repeatedly perform the operations from step S720 to step S765 described above.

As described above, the mobile terminal in accordance with a first embodiment of the present disclosure can efficiently perform the zoom-in operation and the zoom-out operation in succession using the dual camera module including both a standard lens assembly and a wide angle lens assembly.

Figure 10:
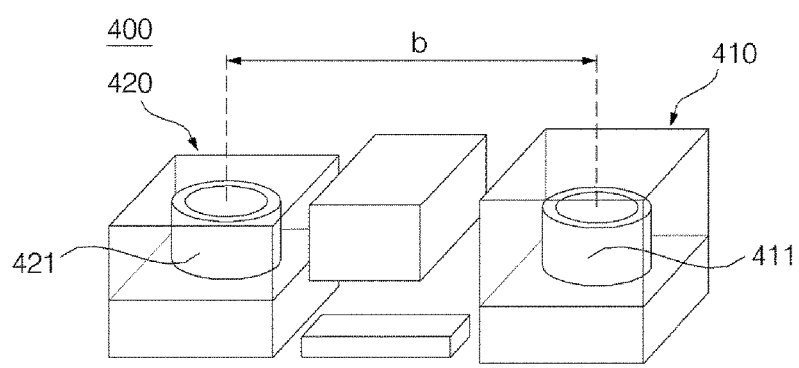
FIG. 10 is a diagram referenced to explain the distance between the two camera modules in the dual camera module in accordance with the first embodiment of the present disclosure.

FIG. 10 is a diagram referenced to explain the distance between the first camera module and the second camera module of the dual camera module in accordance with the first embodiment of the present disclosure.

Dual camera module 400 in accordance with a first embodiment of the present disclosure can perform not only the zoom-in/out function described above, but also a 3D scanning function. In order to efficiently perform the 3D scanning function, the dual camera module 400 needs to be designed to achieve sufficient depth resolution. The depth resolution may be defined by the following Equation 1.

$$dZ_c = \frac{Z^2}{fb} dp_x \qquad \text{[Equation 1]}$$

Here, $dZ_c$ is the depth resolution, Z is the distance to a target subject, f is the focal length, b is the distance between two cameras (baseline), and $dp_x$ is the pixel size.

Based on above Equation 1, to ensure that dual camera module 400 achieves sufficient depth resolution, the distance b between camera modules 410 and 420 mounted in dual camera module 400 should be at least 16.00 mm. Thus, dual camera module 400 in accordance with the first embodiment of the present invention can be configured such that first camera module 410 and second camera module 420 are spaced apart by a distance ranging from 16.00 mm to 25.00 mm.

Dual camera module 400 can configure a depth map using a difference between an image input via first camera module 410 and an image input via second camera module 420. In particular, dual camera module 400 having an ultra-wide angle lens increases the extraction range of the depth map, and may realize a more precise 3D scanning function.

Second Embodiment

Figure 11A:
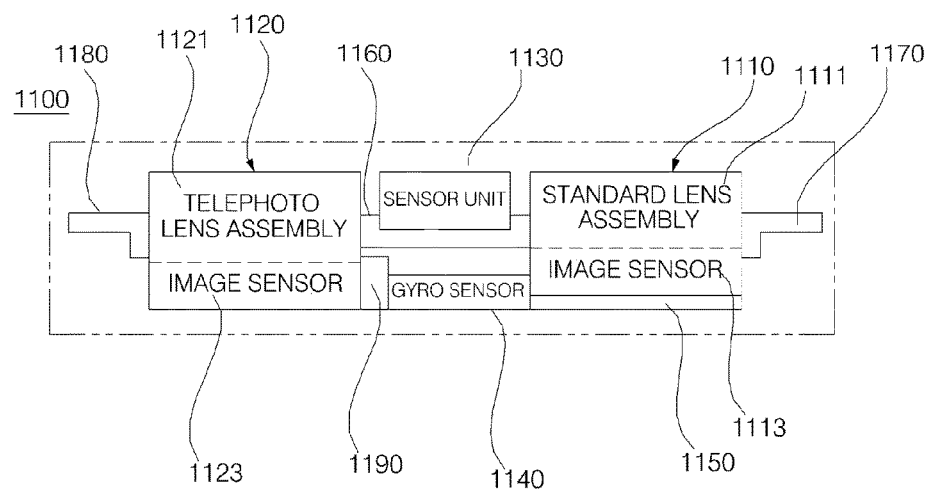
FIGS. 11(a)-(b) and 12(a)-(b) are diagrams referenced to explain the configuration of a dual camera module in accordance with a second embodiment of the present disclosure.
Figure 11B:
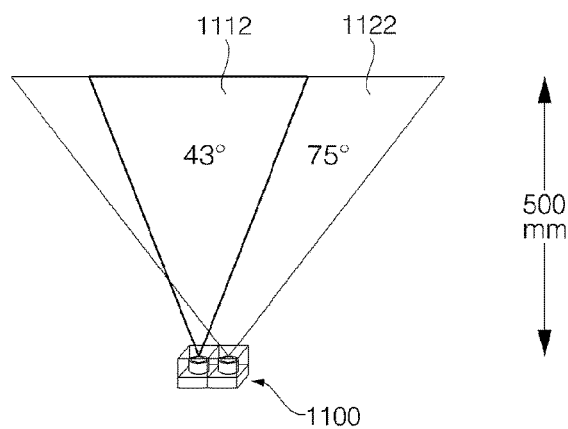

FIGS. 11 and 12 are diagrams referenced to explain the configuration of a dual camera module in accordance with a second embodiment of the present invention.

Referring to FIGS. 11 and 12, a dual camera module 1100 can include a first camera module 1110, a second camera module 1120, a camera sensor unit 1130, a gyro sensor 1140, first and second support members 1150 and 1160, and first to third fixing members 1170 to 1190.

First camera module 1110 can include a standard lens assembly 1111, an IR filter (not illustrated), an image sensor 1113, and an AF driver (not illustrated). In exemplary embodiments, standard lens assembly 1111 used in first camera module 1110 can have a conversion focal length of 43.27 mm and a field of view within a range from 60 degrees to 80 degrees. In a non-limiting exemplary embodiment, image sensor 1113 used in the first camera module 1110 can instead have an aspect ratio of 16:9 and may include 16 mega pixels.

Figure 12A:
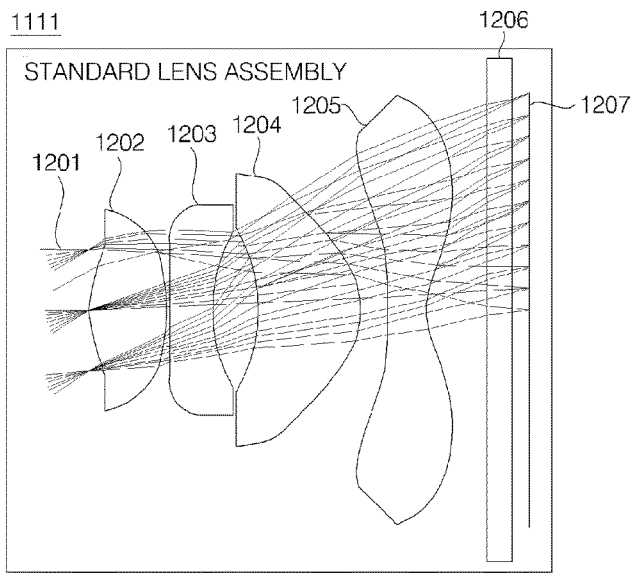

In an exemplary embodiment illustrated in FIG. 12(a), standard lens assembly 1111 is configured such that an aperture 1201, a first lens 1202, a second lens 1203, a third lens 1204, and a fourth lens 1205 are arranged in sequence starting from the target object side. A lens assembly having a field of view within a range from 60 degrees to 80 degrees can be realized through appropriate design of, for example, the arrangement, refractive power, refractive index, thicknesses, sizes, and shapes of the lenses 1202 to 1205.

Light corresponding to image information of the target subject sequentially passes through aperture 1201, first lens 1202, second lens 1203, third lens 1204, fourth lens 1205, and infrared filter 1206 of standard lens assembly 1111 and can be introduced into image sensor 1207.

It will be clear to those skilled in the art that, although the present embodiment illustrates the standard lens assembly 1111 as including total four lenses, the standard lens assembly 1111 is not so limited and may include a larger or smaller number of lenses.

Second camera module 1120 can include a telephoto lens assembly 1121, an IR filter (not illustrated), and an image sensor 1123. Telephoto lens assembly 1121 used in the second camera module 1120 can have a longer focal length (e.g. 55.85 mm) than the conversion focal length of standard lens assembly 1111 and a field of view of 50 degrees or less (e.g. 43 degrees). Also, second camera module 1120 can be a fixed-focus type and can exclude an AF driver.

In addition, image sensor 1123 used in second camera module 1120 can have an aspect ratio of 4:3 and can include 13 mega pixels, without being limited thereto.

Figure 12B:
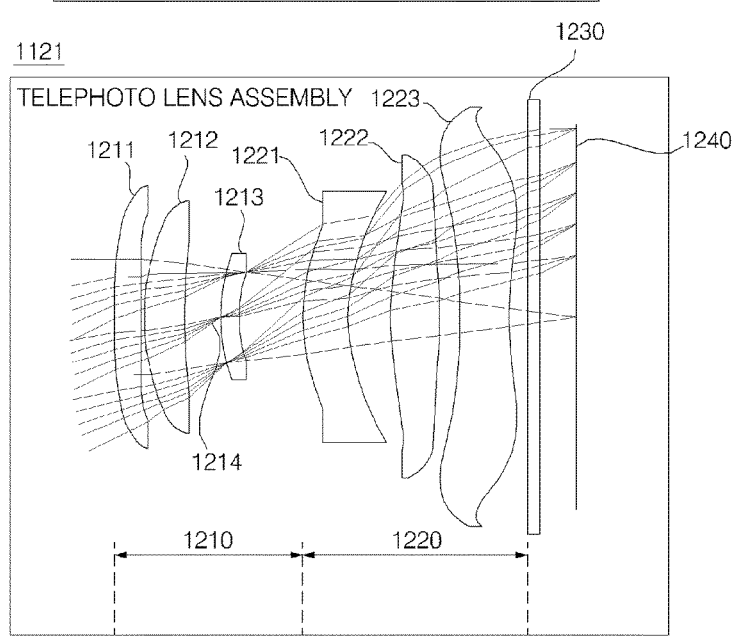

In an exemplary embodiment illustrated in FIG. 12(b), telephoto lens assembly 1121 can have a configuration in which a first lens group 1210 and a second lens group 1220 are arranged in sequence starting from the target object side.

First lens group 1210 can consist of first to third lenses 1211 to 1213 and an aperture 1214, and can serve to increase a focal length. As such, telephoto lens assembly 1121 can be realized to have an effective focal length (EFL) that is two times that of standard lens assembly 1111. Aperture 1210 can be located between second lens 1212 and third lens 1213.

Second lens group 1220 can consist of fourth to sixth lenses 1221 to 1223, and can serve to concentrate light, introduced through first lens group 1210, on image sensor 1240. A lens assembly having a field of view of 50 degrees or less can be realized through appropriate design of, for example, the arrangement, refractive power, refractive index, thicknesses, sizes, and shapes of the first and second lens groups 1210 and 1220.

Light corresponding to image information of the target subject can sequentially pass through first lens group 1210, second lens group 1220, and infrared filter 1230 of telephoto lens assembly 1121 and can be introduced to image sensor 1240.

It will be clear to those skilled in the art that, although the present embodiment illustrates telephoto lens assembly 1121 as including total six lenses, telephoto lens assembly 1121 is not so limited and can include a larger or smaller number of lenses. In addition, it will be clear to those skilled in the art that, although the present exemplary embodiment illustrates telephoto lens assembly 1121 as including the two lens groups, the wide angle lens assembly 421 is not limited, and can include a larger number of lens groups.

Second camera module 1120 can implement an optical zoom function thanks to the increased focal length. In doing so, the dual camera module 1100 including second camera module 1120 can provide a more vivid image than a conventional digital zoom.

In addition, second camera module 1120 can more effectively capture an image of a person thanks to the low depth of field. When doing so, second camera module 1120 can make the background behind a person be out of focus.

Second camera module 1120 can use an image sensor area that has the same aspect ratio as that of the image sensor of first camera module 1110 because of the increased effective focal length. An image sensor having 16 mega pixels, as used in the first camera module 1110, can have an aspect ratio of 16:9 (width:length), and an image sensor having 13 mega pixels, as for example, used in second camera module 1120, has an aspect ratio of 4:3. Thus, it can be necessary to harmonize the aspect ratios of the captured image formed on the image sensor of first camera module 1110 and the captured image formed on the image sensor of second camera module 1120.

Figure 13:
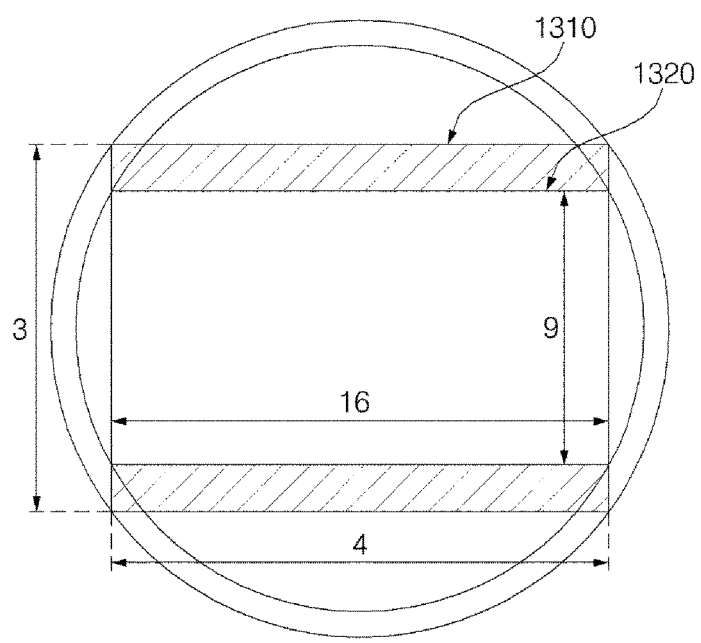
FIG. 13 is a diagram referenced to explain characteristics of a telephoto lens assembly which uses a sensor region having an aspect ratio of 16:9 on an image sensor having an aspect ratio of 4:3.

For example, as illustrated in FIG. 13, by increasing the effective focal length via telephoto lens assembly 1121 on an image sensor 1310 having an aspect ratio of 4:3 and corresponding 13 mega pixels, the second camera module 1120 can allow an image to be formed only on an image sensor area 1320 of image sensor 1310, image sensor area 1320 having an aspect ratio of 16:9 and corresponding 10 mega pixels. By doing so, the captured image input via second camera module 1120 can have the same aspect ratio as that of the captured image input via first camera module 1110, whereby processing of the captured images can be efficiently performed.

Figure 14:
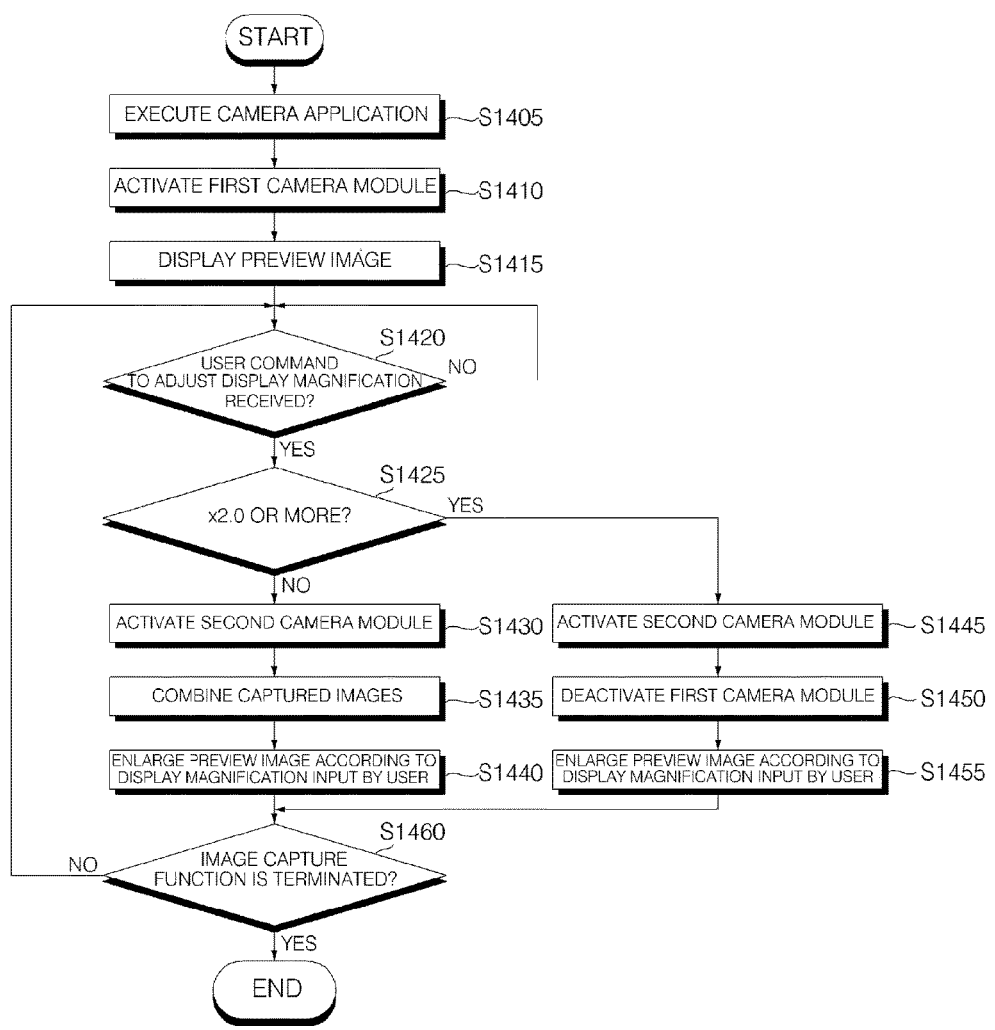
FIG. 14 is a flowchart illustrating the procedure in which the mobile terminal performs a zoom-in operation using the dual camera module in accordance with the second embodiment of the present disclosure.

FIG. 14 is a flowchart illustrating the procedure in which the mobile terminal performs a zoom-in operation using the dual camera module in accordance with the second embodiment of the present disclosure.

Referring to FIG. 14, controller 180 can execute a camera application in response to, for example, a user command (S1405).

Controller 180 can activate just first camera module 1110 of dual camera module 1100 upon execution of camera application (S1410). First camera module 1110 can include standard lens assembly 1111.

Controller 180 can display a preview image, input via first camera module 1110, on display unit 151 (S1415). The preview image displayed on display unit 151 can be an image having a display magnification of 1 (×1.0).

When the preview image is displayed, controller 180 can check whether or not a user command to change the display magnification of the preview image (i.e. a zoom-in/out command) has been received (S1420). The user command can be a pinch in/out motion, or user input for touching a separate zoom icon, received via display unit 151, without being limited thereto.

If at step S1420 a zoom-in command has been received (S1425), controller 180 can check whether the display magnification corresponding to the zoom-in command is 2 (×2.0) or more (S1425).

When the checked result of step S1425 is that the display magnification corresponding to the zoom-in command is below 2 (×2.0), controller 180 activates second camera module 1120 of dual camera module 1100 (S1430). The second camera module 1120 can include telephoto lens assembly 1121.

Controller 180 can perform an operation of combining a first captured image, input via first camera module 1110, with a second captured image input via second camera module 1120, upon receiving the zoom-in command (S1435).

Figure 15:
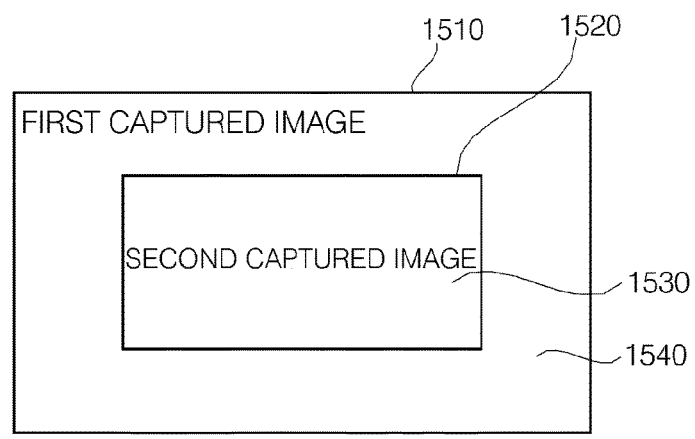
FIG. 15 is a diagram referenced to explain that an area captured via a second camera module is included in an area captured via a first camera module in the dual camera module in accordance with the second embodiment of the present disclosure.

For example as illustrated in FIG. 15, a second captured image 1520, input via second camera module 1120, which can have a small field of view, may be included in a first captured image 1510 input via first camera module 1110, which can have a large field of view. The controller 180 can extract and combine a first image area 1530, corresponding to the overlapping captured area, and a second image area 1540, corresponding to the non-overlapping captured area, via the dual image processor. First image area 1530 can be extracted from the second captured image 1520, and second image area 1540 can be extracted from the first captured image 1510.

Controller 180 can enlarge the preview image according to the display magnification corresponding to the zoom-in command and displays the same on display unit 151 (S1440). The preview image, displayed on the display unit 151, can be generated by combining the first captured image input via first camera module 1110 with the second captured image input via second camera module 1120.

When in step S1425 the display magnification is requested to be a zoom-in command of 2 (×2.0) or more, controller 180 can activate second camera module 1120 of dual camera module 1100, and can deactivate first camera module 1110 (S1445 and S1450). That is, controller 180 can activate just second camera module 1120 of dual camera module 1100.

Controller 180 can enlarge the preview image according to the display magnification corresponding to the zoom-in command and displays the same on display unit 151 (S1455). The preview image, displayed on display unit 151, can be generated by the second captured image input via second camera module 1120. When the zoom-in command is continuously received, controller 180 can enlarge the preview image, input via second camera module 1120, by the maximum display magnification (e.g. ×8.0) and display the enlarged preview image on display unit 151.

Figure 16A:
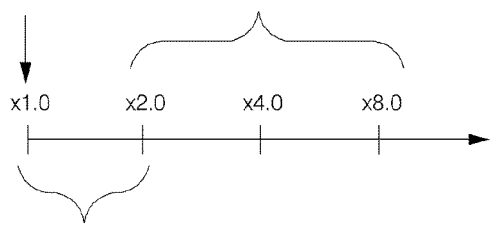
FIGS. 16(a) and 16(b) are diagrams referenced to explain the overall operation of the dual camera module in response to a zoom-in motion of the user.
Figure 16B:
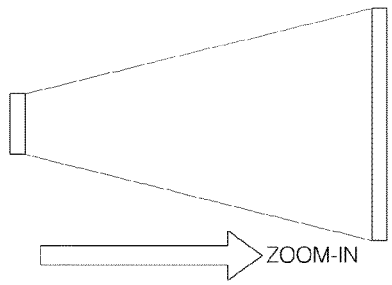

As illustrated in FIG. 16, briefly summarizing the general operation of dual camera module 1100 in response to the zoom-in motion of the user, when the display magnification of dual camera module 1100 is 1 (×1.0) according to an image capture command from the user, controller 180 may activate only first camera module 1110 and display the preview image input via first camera module 1110 on display unit 151.

When the display magnification of dual camera module 1100 is within a range from 1 (×1.0) to 2 (×2.0) according to the zoom-in motion of the user, controller 180 can simultaneously activate first and second camera modules 1110 and 1120, enlarge the preview image, acquired by combining the images input via first and second camera modules 1110 and 1120, according to the display magnification, and display the enlarged preview image on display unit 151.

Also, when the display magnification of dual camera module 1100 is within a range from 2 (×2.0) to the maximum display magnification (e.g. ×8.0) according to the zoom-in motion of the user, controller 180 can activate just second camera module 1120, maximally enlarge the preview image input via second camera module 1120 according to the display magnification, and display the enlarged preview image on display unit 151.

Thereafter, when a user command to end the image capture command is received (S1460), controller 180 can end the zoom-in process using the dual camera module in accordance with the second embodiment of the present disclosure. When no user command to end the image capture command is received (S1460), controller 180 can repeatedly perform the operations from step S1420 to step S1455 described above.

As described above, the mobile terminal in accordance with a second embodiment of the present disclosure can efficiently perform the optical zoom function by capturing images of a nearby area and a faraway area using the dual camera module including a standard lens assembly and a telephoto lens assembly, and then combining the images in real time.

Figure 17:
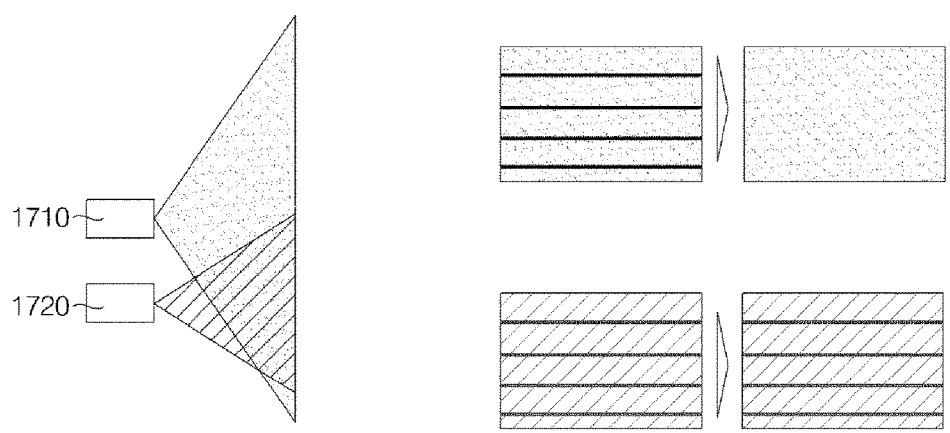
FIG. 17 is a diagram referenced to explain the operation of the dual camera module for adjusting the exposure time based on the detection of an artificial light source by the first and second camera modules.

FIG. 17 is a diagram referenced to explain the operation of the dual camera module for adjusting the exposure time based on the detection of an artificial light source by the first and second camera modules.

A camera can detect flickering caused by artificial light sources based on the image input through a lens, and can change the exposure time in order to remove the flickering. For example, when the camera detects an artificial light source that flickers at 60 Hz, the camera adjusts the exposure time in multiples of $\frac{1}{120}$ s. When the camera detects an artificial light source that flickers at 50 Hz, the camera adjusts the exposure time in multiples of $\frac{1}{100}$ s.

However, when a camera is exposed to solar light (or natural light) rather than an artificial light source, the exposure time may continue to be adjusted so as to remove the flickering despite the absence of flickering caused by an artificial light source. Therefore, in an environment where no flickering occurs, finer adjustments to the exposure can be required, rather than adjustments to the exposure in sets of multiples.

To this end, the dual camera module in accordance with exemplary embodiments of the present invention can use the first camera module for the purpose of image capturing, and may use the second camera module for the purpose of detection of flickering caused by artificial light sources.

For example, as illustrated in FIG. 17, a first camera module 1710 can detect the frequency of an artificial light source based on the image input through a lens. Then, first camera module 1710 can adjust the exposure time based on the detected frequency of the artificial light source so as to prevent the occurrence of flickering. Thereby, first camera 1710 can output a captured image with no flickering.

Meanwhile, a second camera module 1720 can detect the frequency of the artificial light source based on the image input through a lens. Then, unlike first camera module 1710, second camera module 1720 can adjust the exposure time based on the detected frequency of the artificial light source so as to cause the occurrence of flickering. Thereby, second camera module 1720 can monitor whether or not the artificial light source causes flickering in real time.

When the monitoring result via second camera module 1720 is that no flickering occurs due to the artificial light source, the dual camera module can determine that it is exposed to solar light and can stop the exposure adjustment based on exposure multiples, and can instead allow the exposure to be finely tuned.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor can include controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A dual camera module comprising:
    a first camera module having a first focal length and a first field of view;
    a second camera module spaced apart from the first camera module by a predetermined distance, the second camera module having a second focal length and a second field of view, which are different from the first focal length and first field of view;
    a sensor unit located in a space between the first camera module and the second camera module; and
    at least one support to align the first and second camera modules so that beginning points of the fields of view of the first and second camera modules coincide,
    wherein the distance between the first camera module and the second camera module is within a range of 16.00 mm to 25.00 mm.

2. The dual camera module according to claim 1, wherein the first camera module comprises a standard lens assembly having the first focal length, and
    wherein the second camera module comprises a wide angle lens assembly having a shorter focal length than the first focal length.

3. The dual camera module according to claim 2, wherein the wide angle lens assembly includes an aperture that adjusts the amount of light, a first lens group that increases an incidence angle of the light, and a second lens group that concentrates the light on an image sensor.

4. The dual camera module according to claim 2, wherein the first camera module has a field of view within a range of 60 degrees to 80 degrees, and the second camera module has a field of view of 120 degrees or more.

5. The dual camera module according to claim 1, wherein the first camera module includes a standard lens assembly having the first focal length, and
    wherein the second camera module includes a telephoto lens assembly having a longer focal length than the first focal length.

6. The dual camera module according to claim 5, wherein the telephoto lens assembly includes an aperture that adjusts the amount of light, a first lens group that increases a focal length, and a second lens group that concentrates the light on an image sensor.

7. The dual camera module according to claim 5, wherein the first camera module has a field of view within a range from 60 degrees to 80 degrees, and the second camera module has a field of view of 50 degrees or less.

8. The dual camera module according to claim 1, wherein the dual camera module is located on a rear surface of a terminal body.

9. The dual camera module according to claim 1, wherein the sensor unit comprises at least one of an RGB sensor, a laser sensor, a gyro sensor, and a flash.

* * * * *